United States Patent [19]

Tardy

[11] Patent Number: 5,684,297
[45] Date of Patent: Nov. 4, 1997

[54] METHOD OF DETECTING AND/OR MEASURING PHYSICAL MAGNITUDES USING A DISTRIBUTED SENSOR

[75] Inventor: André Tardy, Egly, France

[73] Assignee: Alcatel Cable, Clichy Cedex, France

[21] Appl. No.: 558,158

[22] Filed: Nov. 15, 1995

[30] Foreign Application Priority Data

Nov. 17, 1994 [FR] France ................................. 94 13767
Nov. 17, 1994 [FR] France ................................. 94 13768

[51] Int. Cl.⁶ ............................ G01K 11/00; G01L 1/24; G01B 11/16
[52] U.S. Cl. ............................. 250/227.14; 250/227.18; 385/12; 356/32; 374/131
[58] Field of Search .................... 250/227.14, 227.18, 250/227.19, 227.21, 227.23, 227.27, 237 R, 237 G, 226, 231.1; 385/12, 13, 37; 356/32, 33, 34; 374/120, 130, 131, 161, 162

[56] References Cited

U.S. PATENT DOCUMENTS

| | | | |
|---|---|---|---|
| 4,761,073 | 8/1988 | Meltz et al. | 250/227.18 |
| 4,996,419 | 2/1991 | Morey | 250/227.18 |
| 5,319,435 | 6/1994 | Melle et al. | 250/227.18 |
| 5,493,113 | 2/1996 | Dunphy et al. | 250/227.14 |
| 5,513,913 | 5/1996 | Ball et al. | 250/227.14 |
| 5,563,967 | 10/1996 | Haake | 250/227.14 |

FOREIGN PATENT DOCUMENTS 268581  1/1994  United Kingdom .

OTHER PUBLICATIONS

A. D. Kersey et al, "Multi–element Bragg–grating Based Fibre–Laser Strain Sensor", *Electronics Letters*, vol. 29, No. 11, May 27, 1993, pp. 964–966.

*Primary Examiner*—Edward P. Westin
*Assistant Examiner*—John R. Lee
*Attorney, Agent, or Firm*—Sughrue,Mion,Zinn,Macpeak & Seas, PLLC

[57] ABSTRACT

The present invention relates to a method of detecting and/or measuring changes in a physical magnitude by means of a distributed sensor, changes being detected and/or measured at a plurality of "measurement" points along said sensor, said sensor comprising an optical fiber having an optical core for guiding the majority of light waves, said optical core including a plurality of diffraction gratings distributed along said optical fiber, each situated at one of said measurement points, said diffraction gratings all having substantially the same central reflection wavelength in the absence of strain, the method comprising the following steps: injecting a "detection" light signal into an "inlet" end of said optical fiber, the wavelength of the light signal being close to said central reflection wavelength; determining the power of one of the reflected signals, referred to as the "detected reflected power", as a function of time; comparing said detected reflected power as a function of time with the power reflected as a function of time by the sensor in the absence of any change in said physical magnitude, referred to as the "idle" reflected power; and detecting change in said physical magnitude whenever said detected reflected power differs from said idle reflected power.

6 Claims, 2 Drawing Sheets

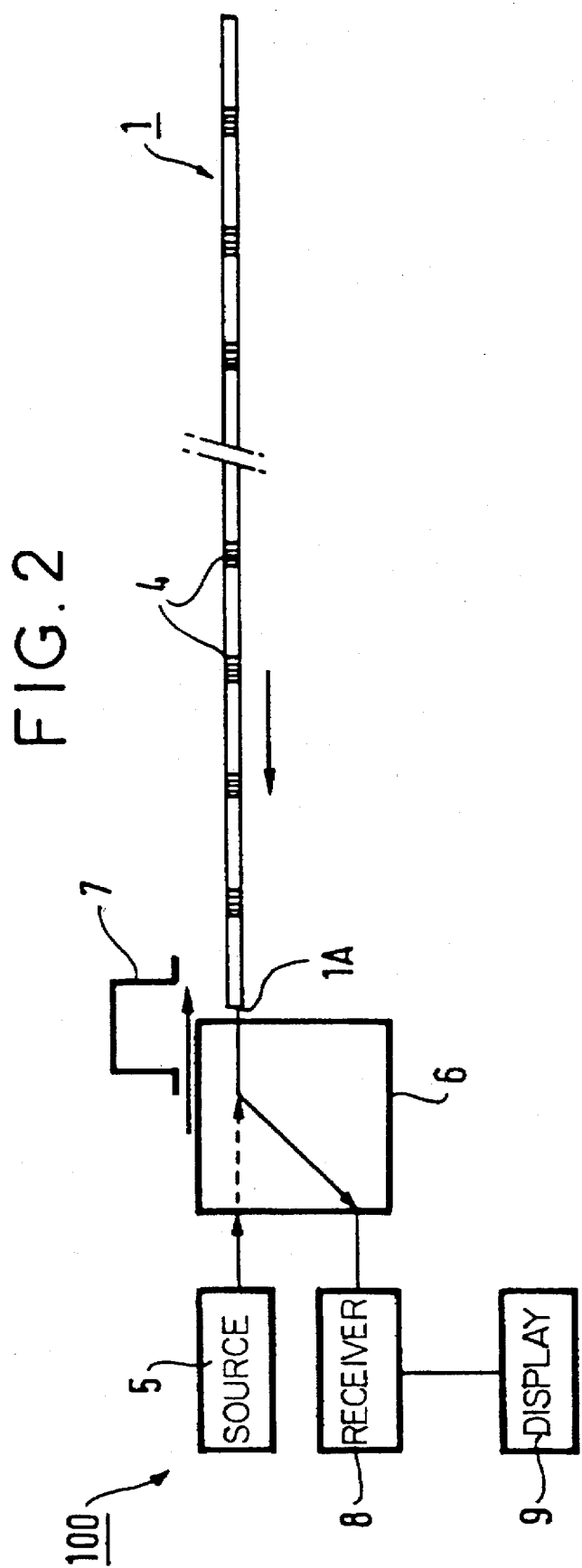

METHOD OF DETECTING AND/OR MEASURING PHYSICAL MAGNITUDES USING A DISTRIBUTED SENSOR

The present invention relates to a method of detecting and/or measuring changes in physical magnitudes, e.g. such as. temperature, pressure, mechanical deformation, electric field, magnetic field, etc. . . . , by using a distributed sensor, and more particularly a distributed sensor in which detection is performed by means of an optical fiber.

BACKGROUND OF THE INVENTION

It is recalled that an optical fiber is a light waveguide comprising a central portion referred to as an optical "core", that is based on silica, and that serves to guide the majority of the light waves, surrounded by a peripheral portion known as optical "cladding", that is likewise based on silica, and that serves to guide those light waves that are not transmitted by the core.

It is well known that by their structure, optical fibers are sensitive to conditions in the medium in which they find themselves. In particular, a change in temperature (e.g. a drop in temperature) causes the fiber to contract, thereby modifying its waveguide properties (increase in optical signal attenuation) in a manner that is easily detectable. The same applies when the optical fiber is subjected, for example, to mechanical stresses causing it to be deformed, to a change in pressure, to changes in electric or magnetic field which interact with the electromagnetic field of a light wave transmitted by the fiber.

Thus, in many known sensors, changes in physical magnitudes are detected by means of optical fibers.

More specifically, some such known sensors use optical fibers in which diffraction gratings have been inscribed, which gratings are typically known as Bragg gratings. By way of example, such sensors are described in the U.S. Pat. No. 4,996,419. The term "Bragg" grating is used below for any diffraction grating, without the field of the present invention being restricted to Bragg gratings only.

As a preliminary point, it is recalled that a diffraction grating inscribed in the core of an optical fiber is constituted by a succession of periodic changes in the refractive index of the core of the fiber over a given length (along the axis of the optical fiber). The cumulative effect of these changes on a light signal transmitted by the fiber is to reflect a significant portion of the signal back towards its injection end, and for this to take place around a wavelength referred to as the "central" reflection wavelength of the diffraction grating, which wavelength is a function of the pitch of the grating and of the initial refractive index of the optical fiber core (i.e. its index before the grating was inscribed). For the remainder of the signal, the refraction grating is substantially transparent. Thus, a diffraction grating inscribed in the core of an optical fiber acts like a narrow bandstop filter for the light signal conveyed by the core.

In the spectrum reflected from the Bragg grating, this gives rise to a peak over a range centered on the central reflection wavelength and that is relatively narrow thereabout, and in the spectrum transmitted through the grating, this gives rise to a corresponding notch at the said wavelength.

Curve 10 in FIG. 1 is a diagram of the reflection spectrum from a Bragg grating, i.e. it is a plot of the power P of the signal reflected by the Bragg grating as a function of wavelength $\lambda$. The central reflection wavelength of the Bragg grating is referenced $\lambda_o$.

$\lambda_o$ is a function of two parameters (refractive index and pitch of the Bragg grating) both of which depend directly on temperature, with changes in temperature giving rise both to changes in refractive index (thermo-optical effect) and to thermal contraction or expansion. These two parameters also depend directly on the mechanical stresses applied to the fiber, with such stresses giving rise to longitudinal deformation of the fiber that naturally causes the pitch of the Bragg grating to vary, and also giving rise to changes of index by the elasto-optical effect. Finally, the parameters of which $\lambda_o$ is a function depend directly on hydrostatic pressure. Thus, an optical fiber having a Bragg grating behaves intrinsically as a temperature probe, as a pressure sensor, or as a strain gauge (and thus a stress gauge).

For example, with reference to changes in magnetic or electric field, by associating an optical fiber containing one or more Bragg gratings with appropriate means, e.g. such as a covering of magnetostrictive or piezoelectric material respectively, for inducing deformation in the fiber under the effect of a change in the field to be monitored, it is possible to associate any change in said magnitudes with a change in the central reflection wavelength $\lambda_o$.

The above phenomena are well known and are used in sensors. To detect changes in a physical magnitude to be monitored, a light signal is applied continuously to the optical fiber and the transmission or reflection spectrum is observed to determine the wavelength of the reflected signal; if the wavelength is not the known wavelength as obtained under normal conditions ("idle" in the absence of any change in the physical magnitude to be monitored), then a change in the monitored magnitude in the vicinity of the grating has been detected; similarly, after appropriate calibration, it is possible to evaluate the magnitude of the detected change as a function of the observed reflection wavelength.

U.S. Pat. No. 4,996,419 thus proposes a distributed sensor comprising an optical fiber in which a plurality of Bragg gratings have been inscribed at a predetermined distance apart from one another, all of the gratings being substantially identical to one another under idle conditions (normal conditions), i.e. each of them has substantially the same central reflection wavelength. Because these Bragg gratings are distributed along the fiber, it is possible to provide a sensor that is distributed, i.e. a sensor having numerous detection and/or measurement points distributed along its length, thereby making it possible to monitor a zone of geographically large extent.

For example, such a sensor may be used in the vicinity of a long power cable in order to locate zones of the cable in which harmful temperature rises occur.

In the above-mentioned patent, in order to detect and/or measure changes in the physical magnitudes to be monitored, one of the ends of the optical fiber is connected to a light source which is tunable over a range of wavelengths that is wide enough to contain all of the reflection wavelengths of the Bragg gratings as modified by changes in the physical magnitudes, and light signals are injected into the optical fiber by scanning over this spectrum of wavelengths. The reflected signals are detected and analyzed as described above, and the corresponding round-trip times are determined in order to locate the point where the physical magnitude to be monitored has been subject to change.

It is also indicated in that patent that the reflection coefficient (ratio of reflected light signal power over incident light signal power) of each of the Bragg gratings must be selected to be around 0.01 in order to avoid the harmful consequences on transmission of multiple reflections between the various gratings.

The method described in the above patent is not entirely satisfactory.

The method recommended needs to sweep through a relatively wide spectrum, and it requires tuning that is as fine as possible on the central reflection wavelength of the Bragg gratings: the narrower the reflection spectrum of the Bragg gratings, the finer the tuning. It is therefore necessary to use a highly accurate tunable source, which implies it is necessary to use instrumentation that is complex and expensive.

Also, the time required to discover the state of all of the measurement points is relatively long since it is necessary to sweep through a spectrum that is quite wide and each change in wavelength of the light source used can be obtained only relatively slowly, taking about 1 second (the time required by the source to stabilize on the new wavelength). In addition, the use of a tunable source of relatively long stabilization time makes integration difficult so that responses coming from the Bragg gratings furthest from the inlet of the sensor cannot be distinguished from the noise inherent to the receiver used.

Also, when implementing the method of U.S. Pat. No. 4,996,419, use of the sensor described in that patent is not entirely satisfactory.

If it is desired that the sensor should have very long range, e.g. about 10 km, then it is necessary to inscribe a very large number of Bragg gratings; for example, in order to have a measurement point every 2 meters (m), 5,000 gratings are necessary. If conventional reflection coefficients are used, such as those recommended in the above patent (0.01), then the contribution of the Bragg gratings to the attenuation of the optical fiber is about 22 dB/km at the central reflection wavelength of the Bragg gratings (e.g. selected to be close to 1.55 µm), and this is very considerably greater than the intrinsic attenuation of the optical fiber (0.3 dB/km at 1.55 µm). Under such circumstances, it is no longer possible to detect the signals reflected by the sensors situated at the end of the fiber since those signals are too attenuated.

Also, it is known that to inscribe a Bragg grating in an optical fiber, it is necessary to expose the core of the fiber through the optical cladding to an interference pattern obtained from two beams of ultraviolet light, with this taking place for a sufficient length of time and at an energy density that increases with increasing desired reflection coefficient.

In addition, with the method of U.S. Pat. No. 4,996,419, it is stated that it is preferable to choose Bragg gratings having a reflection spectrum that is narrow, for example spectrum widths of about 0.1 nm are chosen. Given that the width of the reflection spectrum of a Bragg grating is inversely proportional to its length, the method proposed makes it necessary to use Bragg gratings of relatively great length, and in practice about 10 mm long for a spectrum width of 0.1 nm. However, the power required for inscribing a Bragg grating in an optical fiber is a function of the length of the grating.

Thus, inscribing a very large number of Bragg gratings in line, each having a reflection coefficient of 0.01 and a relatively narrow spectrum width, as is necessary for obtaining a sensor as disclosed in U.S. Pat. No. 4,996,419, requires energy density of about 1 J/cm$^2$. To obtain such energy in limited time (about 10 ns), in particular for the purpose of not penalizing the fiber drawing operation when Bragg gratings are inscribed in line, it is necessary to use a laser of high power and great bulk, thereby complicated industrial production of such gratings.

OBJECTS AND SUMMARY OF THE INVENTION

An object of the present invention is to develop a method using a distributed sensor made up of diffraction gratings such as Bragg gratings, while avoiding the drawbacks mentioned above.

To this end, the present invention provides a method of detecting and/or measuring changes in a physical magnitude by means of a distributed sensor, changes being detected and/or measured at a plurality of "measurement" points along said sensor, said sensor comprising an optical fiber having an optical core for guiding the majority of light waves, said optical core including a plurality of diffraction gratings distributed along said optical fiber, each situated at one of said measurement points, said diffraction gratings all having substantially the same central reflection wavelength in the absence of strain, the method comprising the following steps:

injecting a "detection" light signal into an "inlet" end of said optical fiber, the wavelength of the light signal being close to said central reflection wavelength;

determining the power of the reflected signal, referred to as the "detected reflected power", as a function of time;

comparing said detected reflected power as a function of time with the power reflected as a function of time by the sensor in the absence of any change in said physical magnitude, referred to as the "idle" reflected power; and detecting change in said physical magnitude whenever said detected reflected power differs from said idle reflected power.

Thus, the method of the invention for detection changes in the physical magnitude to be monitored makes use of the power (or in equivalent manner the intensity) of the reflected signal as a function of time: if a change in the physical magnitude to be monitored takes place in the vicinity of one of the diffraction gratings, the central reflection wavelength thereof shifts and it no longer reflects the signal emitted in the vicinity of said wavelength, such that, on the curve representing the power of the reflected signal as a function of time, there can be observed at the point corresponding to said diffraction grating, a drop in power representative of the existence of strain, thus making it possible to detect the change in the associated magnitude.

So long as the sensor has been properly calibrated beforehand, a change of power of given amplitude can be associated with a corresponding change in the central wavelength of the diffraction grating in question, and thus with the physical magnitude to be monitored.

Compared with the method disclosed in U.S Pat. No. 4,996,419, the method of the invention is simpler and makes it possible to use instrumentation that is substantially identical to that used in conventional reflectometers, in particular by avoiding the use of a tunable source.

The method of the invention also avoids any need to make diffraction gratings of narrow band spectrum, and thus of great length, since the invention is based on detecting the power (or the intensity) of the reflected signal, and not its wavelength.

The wavelength of the detection light signal belongs to the band of reflection wavelengths of each diffraction grating, and preferably it lies in the range of wavelengths for which the reflection spectrum of the diffraction grating is substantially linear. Thus, in a determined range of changes in the physical magnitude being monitored, the response of the sensor of the invention is substantially linear.

In addition, in advantageous manner, the wavelength of the detection optical signal lies substantially halfway across the reflection spectrum of the diffraction gratings. Thus, for example, it is possible to calibrate the sensor of the invention so that the median value of the range of variation in the physical magnitude to be monitored corresponds either to maximum amplitude, or else to the median value of excursion in the reflected signal when the incident signal has a wavelength chosen in this way.

In an improvement of the method of the invention, in order to eliminate the effect of changes in power of the signals used because of accidental attenuations, each detection signal is made up of two consecutive light pulses: a pulse whose wavelength is less than the central reflection wavelength of the diffraction gratings; and a pulse whose wavelength is greater than said central reflection wavelength, both of these wavelengths lying within the reflection spectrum of the diffraction gratings. A change in a physical magnitude is detected by using the ratio of the reflected powers detected at the two wavelengths. This has the advantage of doubling the sensitivity of detection or of the measurement performed.

Given that the spectral width of the reflection band of a diffraction grating is very small (about 1 nanometer), differential attenuation between the two wavelengths of the pulses constituting the detection signal is negligible.

According to a particularly advantageous characteristic of the method of the invention, the optical core of the sensor includes $n$ diffraction gratings, where $n$ is an integer greater than 50, and the maximum coefficient of reflection of each of said reflection gratings lies in the range $1/20n$ to $1/2n$.

The use of such a distributed sensor in the method of the invention makes it possible to obtain greater range and a greater number of measurement points than with the method and the distributed sensors of the prior art. The sensor is not very complex and not very expensive to make and it makes it possible to detect changes in physical magnitudes in the vicinity of its end remote from the light source.

The choice of reflection coefficient makes it possible to provide a long range sensor having a large number of measurement points per unit length, and not harmed by the consequences of an increase in fiber attenuation due to the presence of the diffraction gratings (using the same example as before, the contribution of the diffraction gratings to the attenuation of the optical fiber lies in the range 0.02 dB/km to 0.2 dB/km at the central reflection wavelength of the diffraction gratings which is selected to be close to 1.55 μm), and the fiber is easy to manufacture. As mentioned above, the energy required for inscribing a diffraction grating is approximately proportional to the depth of modulation applied to the refractive index, i.e. to the reflection coefficient of the grating to be inscribed. In practice, changing from a reflection coefficient of $10^{-2}$ to a coefficient of $10^{-6}$, for example, with a number of gratings n equal to 5,000, gives rise to a reduction in the power required by a factor of 100.

In addition, even with a reflection coefficient of this order, the level of signal reflected by a diffraction grating remains greater than the level of the signal returned by Rayleigh backscattering, so the two signals are easily distinguished.

In practice, the power of the detected signal as reflected by the sensor is at a maximum when the reflection coefficient is in the vicinity of $1/2n$. For a reflection coefficient that is ten times greater, the maximum power level in the detected signal is about eight hundred times smaller. In contrast, for a reflection coefficient that is ten times smaller, the maximum power level in the detected signal is only about four times smaller.

It is the above observation that has made it possible to solve the problems posed in the prior art by selecting a reflection coefficient for the diffraction gratings lying in the range $1/20n$ to $1/2n$.

In addition, by reducing the reflection coefficient, use of the method of the invention contributes to simplifying the sensors used and to making them less expensive to make.

BRIEF DESCRIPTION OF THE DRAWINGS

Other characteristics and advantages of the present invention appear from the following description of a detection method and detection apparatus of the invention, given by way of non-limiting illustration.

In the accompanying drawings:

FIG. 2 is a highly diagrammatic representation of a diffraction grating sensor including the associated equipment required for performing the desired detection and/or measurement in accordance with the invention.

In all of the figures, common elements are given the same reference numerals.

MORE DETAILED DESCRIPTION

Figure 1:
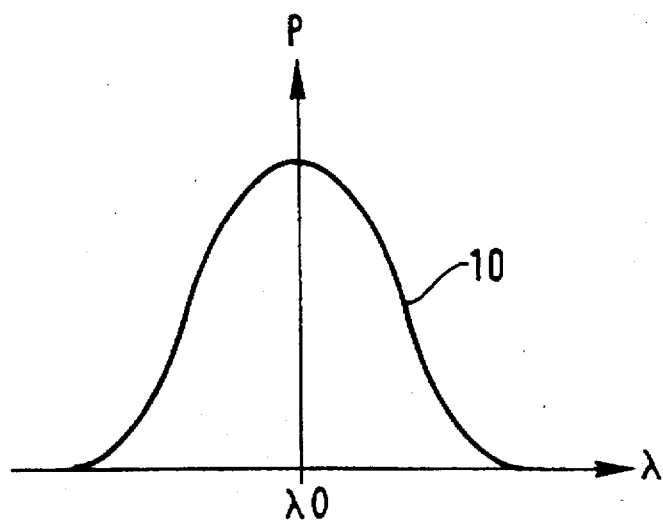
FIG. 1 is a curve showing the reflection spectrum of a Bragg grating.

FIG. 1 is described above with reference to the state of the art.

Highly diagrammatic FIG. 2 shows a sensor 100 for detecting and/or measuring changes in physical magnitudes and making use of a monomode optical fiber 1 as a probe. The fiber 1 comprises an optical core surrounded by optical cladding (not shown), both made of materials based on silica. In the core of the optical fiber 1, there are inscribed Bragg gratings 4, which are all identical to one another, i.e. they all have substantially the same reflection wavelength.

Each Bragg grating 4 is constituted by a succession of periodic variations in the refractive index of the core of the optical fiber 1, the variations extending over a short length of fiber, e.g. 1 mm to 2 mm, with said variations being represented diagrammatically by vertical lines in each of the Bragg gratings 4.

The distance L between two consecutive Bragg gratings 4 (e.g. measured between the centers of each of them) may be constant, as shown in FIG. 2; for example it may be equal to 1 m. In practice, the distance between the various Bragg gratings may be arbitrary, and it is adapted to the element (e.g. a power cable) and to the physical magnitude to be monitored.

The reflection coefficient of each of the Bragg gratings lies in the range $1/20n$ to $1/2n$ (including the end values) with this being done, as explained above, both to avoid excessive increase in the attenuation of the fiber 1 due to the existence of reflections on the various Bragg gratings, and to ensure that the level of the reflected signal remains greater than that of the signal returned by Rayleigh backscattering.

In the sensor 100, the optical fiber 1 is used, when necessary (see above) in association with means (not shown) suitable for converting changes in the physical magnitudes to be monitored into mechanical stresses which are applied to the fiber.

Each of the Bragg gratings 4 in the fiber 1 thus constitutes a measurement point, i.e. a point that is sensitive to changes in the physical magnitude to be monitored, thereby enabling the sensor 100 to perform its function.

Thus, to use the sensor 100 as a temperature sensor, given that the fiber 1 is intrinsically sensitive to changes in temperature, it suffices to place the fiber in the vicinity of the body to be monitored, in a tube that protects it against external mechanical disturbances.

To use the sensor 100 as a strain gauge, it is possible to overmold the bare fiber 1 in a resin along the length of each of the Bragg gratings 4, and then to secure it, e.g. by adhesion, to the body to be monitored.

To use the sensor 100 as a sensor of the hydrostatic pressure of a fluid, the fiber 1 may be placed in an enclosure that communicates with the enclosure containing the fluid to be monitored.

Finally, to use the sensor 100 to detect and/or measure changes in magnetic or electric fields, or indeed other magnitudes, e.g. to detect the presence of water, the fiber 100 may be coated in a material that is sensitive to said magnitudes, as described above.

The sensor 100 also includes a layer light source 5 coupled to one end 1A of the fiber 1 via a coupler 6. The source 5 serves to send "detection" pulses in the form of optical pulses 7 into the fiber 1 for the purposes of detecting and/or measuring the physical magnitude to be monitored.

The duration $\tau$ of the emitted light pulses 7 is selected as a function of the minimum distance L that exists between two consecutive Bragg gratings 4, such that at the wavelength of the pulses 7 (e.g. close to the central reflection wavelength $\mu_o$ of the Bragg gratings 4, and preferably selected to be about 1.55 µm) the signals reflected by the Bragg gratings do not overlap. In practice, $\tau$ will be selected, for example, such that $\tau \leq 2L/V_g$ where $V_g$ is the group velocity of the light wave.

In addition, because of the simplicity in the acquisition electronics made possible by the method of the invention, with said simplicity limiting the frequency of the electronics to 100 MHz, the pulse width $\tau$ is, in practice, greater than 10 ns. Thus, $\tau$ is small compared with the time width corresponding to the length of each of the Bragg gratings 4, such that reflected pulses are of a shape that is substantially identical to the shape of the incident pulses. As a result, if an incident pulse is calibrated to have a relatively long plateau, then the reflected pulse will likewise have a similar plateau, thereby facilitating the acquisition of a plurality of samples enabling the height thereof to be measured, and thus making it easier to determine the amplitude of the reflected power as detected in a manner that is very accurate. This gives rise to measurements of great accuracy.

By choosing to have Bragg gratings 4 that are very short, it is possible to avoid uncertainty associated with integration performed over the length of fiber 1 that is equivalent to the width of the incident pulse, in the event that the zone in which changes take place in the physical magnitude to be monitored is highly localized.

The sensor 100 also includes a receiver 8 coupled to the end 1A of the fiber 1 via the coupler 6 so as to receive the signals reflected by the fiber 1 in response to an incident pulse 7.

The receiver 8 is connected to display means 9, e.g. an oscilloscope, for displaying the reflected signals. The reflected signals are described in greater detail with reference to FIG. 3.

There follows a description of a method of detecting and a method of measuring changes in a physical magnitude, e.g. temperature, in accordance with the invention and using a sensor 100.

The sensor 100 is disposed, for example, parallel to and in the immediate vicinity of a power cable along which it is desired to detect local heating, which heating may, in the long run, harm the proper operation of the cable. Within the sensor 100, the optical fiber 1 is subjected to changes in temperature, such that a local temperature change can be associated with a corresponding change in the central reflection wavelength of the Bragg grating located in the vicinity of the zone where temperature is varying.

Using the light source 5, detection signals are regularly emitted in the form of light pulses 7. The emission period of these light pulses is preferably greater than the time required for a pulse to be reflected from the Bragg grating that is furthest from the end 1A of the fiber 1.

The wavelength of the light pulses 7 is selected, in a first variant, to be substantially equal to the central reflection wavelength $\lambda_o$ of the Bragg gratings.

Figure 3:
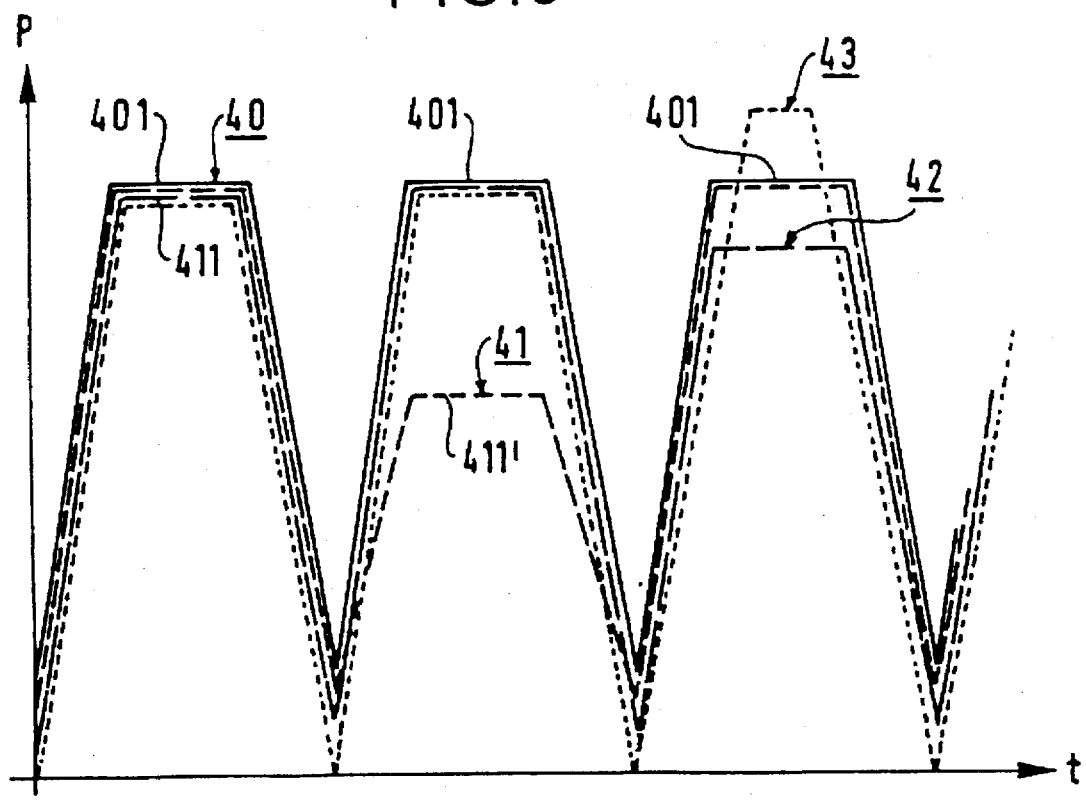
FIG. 3 is a graph showing idle reflected power and reflected power as measured in the method of the invention.

If no temperature change takes place at any of the Bragg gratings, then the signal reflected from the fiber 1 in response to emission of the pulse 7 has the shape shown by curve 40 in FIG. 3, which curve is a plot of reflected power P as a function of time: it can be seen that the reflected signal is made up of a succession of pulses 401 each corresponding to the response of a different Bragg grating; all of the pulses 401 are substantially identical to one another and to the incident pulse 7.

Should a temperature change occur at one of the Bragg gratings, the signal reflected by the sensor 100 after an incident pulse 7 has been emitted, has the shape shown by curve 41 in FIG. 3: the reflected pulses 411 corresponding to the Bragg gratings at which no temperature change has occurred remain identical to one another (and to the pulses of the curve 40); however, the pulse 411' reflected by the Bragg grating in the vicinity of which temperature change has taken place has an amplitude that is different from that of the others (greater or smaller depending on whether an increase or a decrease in temperature is being detected).

Thus, mere observation of the fact that the curve 41 differs from the curve 40 on the display means 9 makes it possible to detect that a change in temperature has occurred. The same naturally applies when a plurality of changes occur at a plurality of separate locations.

By determining the time that elapses between emission of an incident pulse and reception of a reflected pulse, the location of the Bragg grating that reflected the pulse is obtained directly, thereby giving the point along the power cable in the vicinity of which the change has taken place.

If it is desired to measure the amplitude of the detected temperature change, then it suffices to begin by calibrating the sensor 100 so as to associate each temperature change, for example, with the corresponding maximum amplitude of the reflective pulse.

To detect or measure changes in the physical magnitude to be monitored, it is possible, as mentioned above, to observe merely the reflected signal; it is also possible to calculate the difference or the ratio at each instant t between the power P of the reflected signal as detected, referred to as the "detected reflected power", and the power $P_o$ referred to as the "idle reflected power" of the signal as reflected by the "idle" sensor, i.e. by the sensor in the absence of any change in the physical magnitude to be monitored. When the difference or the ratio exceeds a predetermined threshold, then the presence of a change at the corresponding instant is detected (i.e. a change at the corresponding point), and optionally it is possible to measure its amplitude.

The wavelength of the detection light signal which necessarily lies in the band of reflection wavelengths for each of the diffraction gratings, advantageously lies in the range of wavelengths for which the reflection spectrum of the Bragg gratings 4 is substantially linear. In addition, the wavelength of the detection optical signal may be located substantially halfway along the reflection spectrum of the Bragg gratings 4.

In another improvement of the invention, in order to eliminate accidental changes in the attenuation of the fiber 1, each incident detection signal comprises two consecutive pulses, one centered on a wavelength $\lambda_1$ less than $\lambda_o$ and the other centered on a wavelength $\lambda_2$ greater than $\lambda_o$, with the differences between $\lambda_o$ and $\lambda_1$, and between $\lambda_o$ and $\lambda_2$, being substantially identical; naturally, $\lambda_1$ and $\lambda_2$ both lie within the reflection spectrum of the Bragg gratings. When a change in temperature takes place at one of the Bragg gratings, the reflected signal obtained at the wavelength $\lambda_1$ is as shown in FIG. 3 by the curve 42, and at the wavelength $\lambda_2$ it is as shown by the curve 43, so at each instant a ratio is determined between the maximum amplitudes of the two responses from the two incident pulses. When the ratio differs from a pre-established threshold, then a change has been detected in the physical magnitude to be monitored, and the change can be measured if appropriate calibration has previously been performed.

This improvement makes it possible to obtain a sensor of the invention having sensitivity that is close to 1%/° C.

From the above, it can be observed that the detection or measurement method of the invention is much simpler than that used in the prior art, since it corresponds, in practice, to the method used in conventional reflectometer methods.

Naturally, the present invention is not limited to the embodiment and to the methods described above, and any means may be replaced by equivalent means without going beyond the ambit of the invention.

I claim:

1. A method of detecting and/or measuring changes in a physical magnitude using a distributed sensor, changes being detected and/or measured at a plurality of measurement points along said sensor, said sensor comprising an optical fiber having an optical core for guiding a majority of input light waves, said optical core including a plurality of diffraction gratings distributed along said optical fiber for reflecting a portion of said input light waves to create reflected signals, each diffraction grating situated at one of said measurement points, said diffraction gratings each having a central reflection wavelength in the absence of strain which is substantially the same for all diffraction gratings, and said diffraction gratings all having a reflection spectrum;

the method comprising the following steps:
injecting a detection light signal into an inlet end of said optical fiber, the light signal having a Wavelength close to said central reflection wavelength;
determining the power of one of said reflected signals, referred to as detected reflected power as a function of time; said detected reflected power having an amplitude;
comparing said detected reflected power as a function of time with an idle reflected power which is power reflected as a function of time by said sensor in the absence of any change in said physical magnitude; and
detecting change in said physical magnitude whenever said detected reflected power differs from said idle reflected power.

2. A method according to claim 1, wherein the wavelength of said detection light signal which lies in the a band of reflection wavelengths of each of said diffraction gratings, lies in a range of wavelengths for which the reflection spectrum from said diffraction gratings is substantially linear.

3. A method of detecting and/or measuring changes in a physical magnitude using a distributed sensor, changes being detected and/or measured at a plurality of measurement points along said sensor, said sensor comprising an optical fiber having an optical core for guiding a majority of input light waves, said optical core including a plurality of diffraction gratings distributed along said optical fiber for reflecting a portion of said input light waves to create reflected signals, each diffraction grating situated at one of said measurement points, said diffraction gratings each having a central reflection wavelength in the absence of strain which is substantially the same for all diffraction gratings, and said diffraction gratings all having a reflection spectrum;

the method comprising the following steps:
injecting a detection light signal into an inlet end of said optical fiber, the light signal having a wavelength close to said central reflection wavelength;
determining the power of one of said reflected signals, referred to as detected reflected power as a function of time; said detected reflected power having an amplitude;
comparing said detected reflected power as a function of time with an idle reflected power which is power reflected as a function of time by said sensor in the absence of any change in said physical magnitude; and
detecting a change of a physical magnitude at each measurement point by determining a ratio of the detected reflected power to the idle reflected power, and by comparing said ratio with a predetermined threshold.

4. A method of detecting and/or measuring changes in a physical magnitude using a distributed sensor, changes being detected and/or measured at a plurality of measurement points along said sensor, said sensor comprising an optical fiber having an optical core for guiding a majority of input light waves, said optical core including a plurality of diffraction gratings distributed along said optical fiber for reflecting a portion of said input light waves to create reflected signals, each diffraction grating situated at one of said measurement points, said diffraction gratings each having a central reflection wavelength in the absence of strain which is substantially the same for all diffraction gratings, and said diffraction gratings all having a reflection spectrum;

the method comprising the following steps:
injecting a detection light signal into an inlet end of said optical fiber, the detection light signal comprising two consecutive light pulses, a pulse whose wavelength belongs to the reflection spectrum of the diffraction gratings and is less that said central reflection wavelength, and a pulse whose wavelength belongs to the reflection spectrum of the diffraction gratings and is greater than said central reflection wavelength;
determining the power of said reflected signals for each of the two consecutive light pulses, referred to as a first detected reflected power and a second detected reflected power, respectively, as a function of time; each detected reflected power having an amplitude;
comparing said first detected reflected powers with the second detected reflected power to produce a ratio of the detected reflected power having a value; and detecting a change in physical magnitude by comparing the ratio of the detected reflected powers with a predetermined value.

5. A method according to claim 1, wherein, to measure a change in said magnitude, prior calibration is performed so as to associate each amplitude of said detected reflected power with a corresponding amplitude of said magnitude.

6. A method according to claim 1, wherein, for an optical core of said sensor containing diffraction gratings, where n is an integer greater than 50, a maximum reflection coefficient of each of said diffraction grating lies in the range 1/20n to 1/2n.

* * * * *